Figure 1:
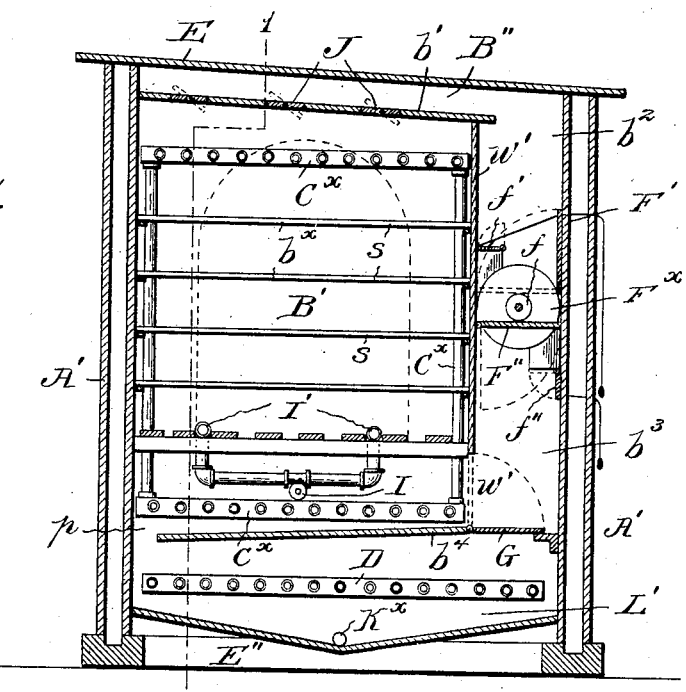

No. 761,042. PATENTED MAY 24, 1904.
L. GATHMANN.
DRIER.
APPLICATION FILED DEC. 5, 1903.
NO MODEL.

Witnesses.
Harry L. Ames
M. E. Biall

Inventor.
Louis Gathmann
by Henry J. Wolf
Attys.

No. 761,042.

Patented May 24, 1904.

UNITED STATES PATENT OFFICE.

LOUIS GATHMANN, OF WASHINGTON, DISTRICT OF COLUMBIA, ASSIGNOR OF ONE-FOURTH TO ELDRED P. DICKINSON AND SOMERSET R. WATERS, OF WASHINGTON, DISTRICT OF COLUMBIA.

DRIER.

SPECIFICATION forming part of Letters Patent No. 761,042, dated May 24, 1904.

Original application filed October 1, 1903, Serial No. 175,339. Divided and this application filed December 5, 1903. Serial No. 183,952. (No model.)

*To all whom it may concern:*

Be it known that I, LOUIS GATHMANN, a citizen of the United States, residing at Washington, in the District of Columbia, have invented certain new and useful Improvements in Driers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has relation to driers of the type shown and described in my application for Letters Patent filed October 1, 1903, Serial No. 175,339, of which this present application is a division.

In the drying of materials in accordance with my invention set forth in my aforesaid application, and in accordance with the process described in another application filed by me on or about February 9, 1903, Serial No. 142,653, and in accordance with the character or nature of the substance or material to be dried the following features, which form the subject-matter of the present application, are of great advantage—to wit, a structure as compact as possible embodying the following: first, means to produce a vaporous or vapor-saturated atmosphere in the drying-chamber by means of moisture evolved from the material to be dried by heat derived from a heater located in the drying-chamber itself or by heat derived from a heater-condenser located below the drying-chamber or from both, said heater in the drying-chamber also serving to restore the heat lost by lowering the temperature of the vaporous or vapor-saturated atmosphere after it moves out of contact with the substances to be dried; second, means to produce the aforesaid vaporous atmosphere artificially, as by steam admitted to said drying-chamber; means to cut the heating condensing chamber out of the circuit, thereby shortening the same when producing a saturated atmosphere by a more or less prolonged circulation of the vaporous atmosphere; third, means to establish the circulation either upwardly or downwardly through the substance or material to be dried, and means to vary the volume of vapor-laden or vapor-saturated atmosphere through the heating condensing chamber or space of the drying-chamber, these features being combined with means for directing the flow of the vaporous atmosphere through the drying-chamber and with means for cutting the latter out of the circuit.

That my invention may be fully understood I will describe the same in detail, reference being had to the accompanying drawings, in which—

Figure 2:
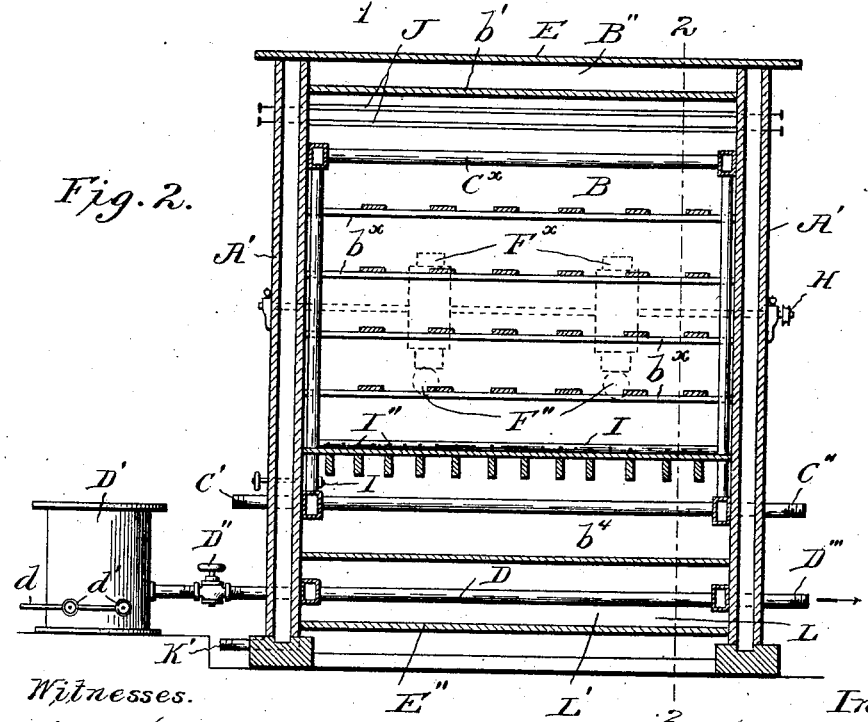

Figure 1 is a vertical section on line 2 2 of Fig. 2, which latter is a longitudinal section on line 1 1 of Fig. 1.

A' A' indicate the vertical walls of the apparatus, which walls are preferably double or jacketed walls to minimize the loss of heat by radiation.

E is the roof of the apparatus, and E'' its dished or reversely-inclined bottom, provided with the outlet-port $K^\times$ for the condensate.

In the described housing is built a drying-chamber B' of less dimensions than the internal dimensions of the housing, so as to form a flue B'' extending over the roof $b'$, in which are formed ports controlled by dampers J, whereby the drying-chamber can be cut out of the circuit, as hereinbefore stated, the said flue B'' communicating with a vertical flue extending along the inner vertical wall $w'$ of the drying-chamber B'. As shown in Fig. 1, the vertical flue is divided into upper and lower flue-sections $b^2$ $b^3$ by a suitable partition on which are secured two fan-blowers $F^\times$, (shown in dotted lines in Fig. 2 and one of them in full lines in Fig. 1,) the fan-blower casings having axial inlet-ports $f$ and two discharge-pipes projecting upwardly and downwardly, each being provided with a valve or gate $f'$ and $f''$, respectively. In the aforesaid partitions are formed openings controlled by gates F' F'', respectively, above and below the axial inlet-ports of the fan-cases. If, as shown in Fig. 1, valve $f'$ of upper discharge-pipes of fan-cases and gates $F''$ below axial inlets $f$ are closed, the circulating fluid will be taken from the upper flue-section $b^2$ and discharged into the lower flue-section $b^3$ and forced thence into the lower end of the drying-chamber B through the same and the ports in its roof, through $B''$ back to the upper vertical flue-section $b^2$ and fan-cases, and so on. If, on the contrary, valves $f'$ and gates $F''$ are opened and valves $f''$ and gates $F'$ are closed, then the air will be taken from the lower flue-section $b^3$ and discharged into the upper flue-section $b^2$ and forced through flue $B''$, thence through the damper-controlled ports of the roof $b'$ of drying-chamber $B'$, through the latter, and back to the lower flue-section $b^3$, thus providing a means for reversing the circulation.

The drying-chamber $B'$ has a laterally-inclined bottom $b^4$, that extends from its inner vertical wall near to its outer vertical wall, forming a port or passage $p$, extending the full length of and placing drying-chamber $B'$ in communication with heating and condensing-chamber $L'$ below said bottom and allowing condensate, should such form in chamber $B'$, to discharge into said chamber $L'$.

The lower end of the flue-section $b^3$ is closed and has formed therein ports controlled by dampers or gates G, and in the lower part of the vertical wall $w$ of drying-chamber $B'$ are formed ports $w'$, adapted to be closed by the dampers G. I am thus enabled to cause the circulating fluid to flow through either chamber $B'$ or $L'$ or to cause a greater or less portion of such fluid to flow through said chambers or cut the chamber $L'$ out of the circuit. In the described construction the chamber $L'$ forms virtually a by-pass from flue-section $b^3$ to chamber $B'$, or vice versa.

In the chamber $L'$ is located a heater-condenser D, and for the purpose of controlling the supply of heating or cooling medium to the heater-condenser D, I provide a separate vessel $D'$, connected to said heater-condenser by a pipe provided with a valve $D''$. The fluid to be heated or the cooling agent is supplied to vessel $D'$ through valve-controlled pipe $d$. The vessel $D'$ is provided with burners, to which a suitable fuel, gaseous or liquid, is supplied through pipe $d'$, having valve-controlled branch pipes leading to said burners. (Not shown.) I am thus enabled to supply a heating medium to the heater-condenser D to gradually decrease the temperature thereof or to supply a cooling medium to said heater-condenser, of any desired or required low temperature for condensing purposes, the heating or cooling agent being exhausted from the condenser through pipe $D'''$, which may be a return pipe to vessel $D'$ or to a receiver or condenser, according to the nature of the heating or cooling fluid supplied to vessel $D'$.

As shown in Fig. 1, the heater $C^\times$, whereby the circulating fluid is maintained at a vaporizing temperature, is also contained in the drying-chamber $B'$, so that I thus obtain a structure wherein the loss of heat by radiation is minimized. In said Fig. 1 I have also shown perforated or jet pipes $I'$ supplied with steam through pipe I from any suitable source for the purpose of producing an initial vaporous atmosphere.

In practice and as is common the drying-chamber $B'$ will be provided with a thermometer and a hygrometer, though this is not absolutely necessary.

The operation is as follows: The saturated atmosphere, hereinbefore referred to, may be produced in several ways, according to the physical character of the substance or material to be dried, and particularly according to the percentage of vaporizable matter to be eliminated. Thus, for instance, if the substance or material contains quite a large percentage of vaporizable matter, I cut the drying-chamber out of the circuit, heat the substance and air in said chamber by heat supplied to heater-condenser D until the air in the chamber becomes saturated. When the substance to be dried is very dense or contains but a small percentage of vaporizable matter, I produce first a vaporous atmosphere in the cut-out drying-chamber, then reëstablish the circuit, cause the vaporous atmosphere to circulate therein and heat the same by heat from heater-condenser D and from heater $C^\times$ to a temperature above the boiling-point of the vaporizable matter to be eliminated from the substance or material to be dried, and continue the circulation until the air becomes saturated with vapor. When the substance or material to be dried is bulky, more or less porous, and a poor conductor of heat, and therefore liable to surface drying before a vaporizing heat can penetrate into and permeate the same, I also first produce a vaporous atmosphere, but artificially, by admitting more or less steam into the drying-chamber through jet-pipe $I'$. I then reëstablish the circuit through the drying-chamber and cause the vaporous atmosphere to circulate therein and at the same time heat said atmosphere to a temperature above the boiling-point of the vaporizable matter to be eliminated from the substance or material to be dried and continue the circulation until the air is saturated, during which operation I reverse the circulation occasionally, whereby the heating of the material through and through is greatly expedited. Having produced a saturated atmosphere I begin to so regulate the heating medium supplied to heater-condenser D as to lower the temperature of the saturated atmosphere sufficiently to condense vapor from said saturated atmosphere after it passes out of contact with the substance or material to be dried and by diverting a portion of the saturated atmosphere to cause it to flow through by-pass or chamber L', which is effected by the adjustment of dampers or gates G. I then restore the lost heat to the atmosphere (partly deprived of vapor) on its return to the drying-chamber and contact with the substance or material to be dried by heat from heater $C^x$ so that said atmosphere will again become saturated. These operations are continued, the temperature in the lower part L of the drying-chamber being gradually lowered until insufficient vapor is evolved from the substance or material to be dried to maintain the air saturated, at which time the substance or material will be internally dry, and condensation may then be proceeded with as fast as the vapors are evolved from said substance or material. The temperature in L', relatively to the heat supplied by heater $C^x$, can be regulated with great nicety by means of the heater-cooler D, so that a rational condensation, and consequently a comparatively rapid elimination of vaporizable matter from any substance or material to be dried, is possible, with a minimum loss of heat.

By means of the described apparatus I am also enabled to recover such vaporizable matter from substances or materials, the recovery of which may be desirable—for instance, in the drying of substances or compounds containing a solvent or vaporizable constituents, the boiling-points of which differ. In the latter case I produce the vaporous atmosphere by vaporizing that constituent which has the lowest boiling-point, then proceed with the vaporization in the order of the boiling-points of the several vaporizable constituents, while the condensation will be so regulated as to condense said constituents in the inverse order of their boiling-points. I am thus enabled to recover separately two or more volatilizable constituents from a substance or material containing such.

Having thus described my invention, what I claim as new therein, and desire to secure by Letters Patent, is—

1. An apparatus having in circuit a drying-chamber, means to heat the air when confined in said chamber to a vaporizing temperature, means to induce a forced circulation through the circuit, means to cool the air to a condensing temperature after it moves out of contact with the substance or material in said chamber, means to restore the lost heat to the air after cooling, and means to direct the flow of air upwardly or downwardly through the chamber, for the purpose set forth.

2. An apparatus having in circuit a drying-chamber, means to maintain a vaporizing temperature therein, a condensing-chamber below the drying-chamber, and means to produce a forced circulation through the circuit; in combination with means to include the condensing-chamber in, and cut it out of the circuit, for the purpose set forth.

3. An apparatus having in circuit a drying-chamber, means to maintain a vaporizing temperature therein, a heating condensing-chamber below said drying-chamber and means to produce a forced circulation through the circuit; in combination with means to cut the heating condensing-chamber out of said circuit, for the purpose set forth.

4. An apparatus having in circuit a drying-chamber, means to maintain a vaporizing temperature therein, a condensing-chamber below the drying-chamber and adjustable dampers or valves controlling suitable ports adapted to vary the volume of fluid flowing through said chamber and to cut the latter out of the circuit, for the purpose set forth.

5. An apparatus having in circuit a drying-chamber, means therein to maintain a vaporizing temperature, a heating and condensing chamber below the drying-chamber, a circulating-flue extending along one side and the roof of said drying-chamber, means to connect the said flue with the heating and condensing chamber and with the drying-chamber, and one or more fan-blowers located in said flue, for the purpose set forth.

6. An apparatus having in circuit a drying-chamber, means therein to maintain a vaporizing temperature, a heating and condensing chamber below the drying-chamber, a circulating-flue extending along one side and the roof of said drying-chamber, means to connect the said flue with the heating and condensing chamber and with the drying-chamber, one or more fan-blowers located in said flue and means for directing the flow of fluid in either a downward or an upward direction through the flue, for the purpose set forth.

7. An apparatus having in circuit a drying-chamber provided with damper-controlled ports in its roof, means in said chamber to maintain a vaporizing temperature therein, a heating and condensing chamber below said drying-chamber, a circulating-flue extending along one side and the roof of the chamber, and one or more fan-blowers in said flue, for the purposes set forth.

In testimony that I claim the foregoing as my invention I have signed my name in presence of two subscribing witnesses.

LOUIS GATHMANN.

Witnesses:
PHILIP F. LARNER,
HENRY ORTH.